E. B. Wells,
Hanging Saws,
No. 9,846. Patented July 12, 1853.
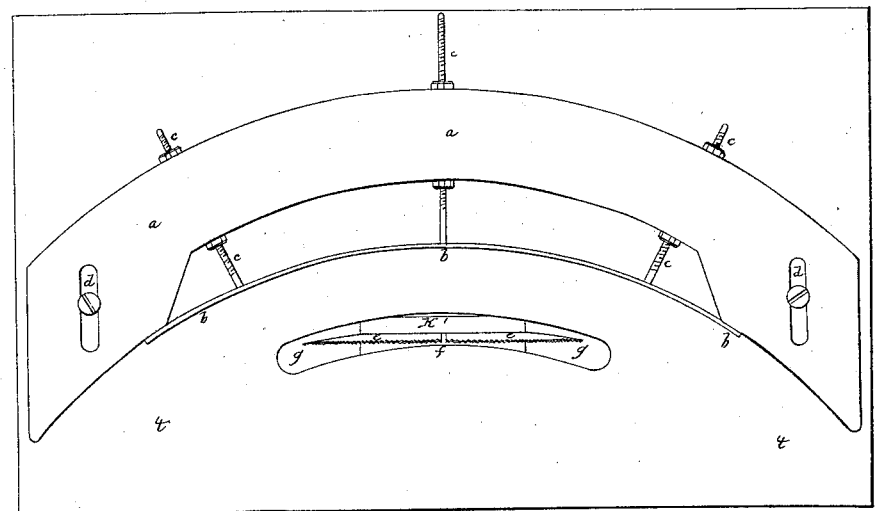
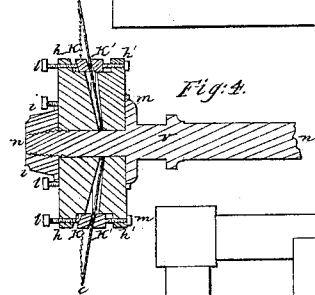
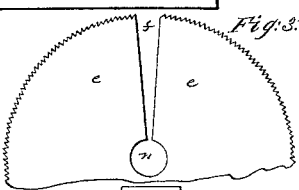
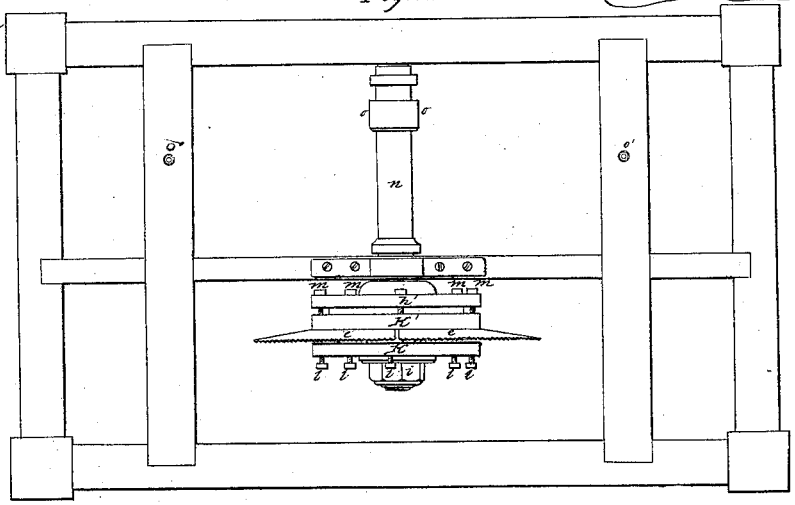
Witnesses. Inventor.

UNITED STATES PATENT OFFICE.

EPHRAIM B. WELLS, OF UNIONTOWN, PENNSYLVANIA.

ADJUSTING DISHING-SAWS.

Specification of Letters Patent No. 9,846, dated July 12, 1853.

*To all whom it may concern:*

Be it known that I, EPHRAIM B. WELLS, of Uniontown, in the county of Fayette and State of Pennsylvania, have invented a new and useful Improvement on Circular Saws for Curvilinear Cutting; and I do hereby declare that the following is a full, clear, and exact description of the construction and operation of the same, reference being had to the annexed drawings, making a part of this specification, in which—

Figure 1, is a view of the top or bed of the bench and the alterable guide, together with the toothed edge of the saw in position for cutting, Fig. 2 is a perspective view of the interior of the bench containing the saw with its spindle, washers and rings in position, $n$ being the spindle, $o\ o$ the driving pulley, $h'$ the concave washer, $k'$ the concave ring, $m, m$ the screws which operate upon the concave ring, $e\ e$ the saw, $k, k$ the convex ring, $h$ the convex washer, $l, l$ the screws operating upon the convex ring, and $i$ the nut working on the screw end of the spindle. Fig. 3 is a view of the saw, with its angular incision $f$, and Fig. 4 is a longitudinal section of the spindle, the washers, rings, saw and screws being all adjusted upon it.

The construction of my saw is as follows: I take a common circular saw as $e\ e$, Fig. 3, in which I make an angular incision $f$ extending from the eye to the edge of the saw. I then take the spindle $n\ n$, Fig. 4, having a fast collar $v$. Up to this fast collar I then bring a single concave circular washer, with its concave surface facing outward $h'\ h'$, Fig. 4, the concave circumference of which is a detached ring $k'$, Fig. 2, forming about one half the edge or periphery of the washer and extending inward on the concave surface of the washer about one fifth of its radius. I pierce the washer near its periphery for screws $m\ m\ m$, Fig. 4, which act on the ring $k'\ k'$ perpendicularly to the plane of the washer $h'\ h'$ and thrust it forward from its first position, as in Fig. 2. I then place the saw upon the spindle. I next place upon the spindle and up to the saw a convex washer $k\ k$, of which the convexity corresponds to the concavity of the concave washer. Its convex circumference, or outer edge, is also a detached ring, forming about half the periphery of the convex washer and extending inward a distance of about one-fifth of its radius. This ring $k, k$, is also operated upon by screws $l\ l$ placed near the outer edge of its washer, in the same way as the ring previously described. The outer end of the spindle I cut into a screw fitted with the nut $i\ i$, which as it moves forward upon the spindle drives before it the convex washer $h\ h$, and forces the central portion of the saw into the concavity of the concave washer $h'\ h'$, which concavity, as well as the convexity of the washer $h\ h$, may be, in effect, increased or diminished to any required amount by protruding or retracting the rings $k'\ k'$ and $k\ k$ from or to their respective washers $h'\ h'$ and $h\ h$, thus giving to the saw any required curvature. A further use of the rings is more firmly to hold and keep the saw in position. $o\ o$ Fig. 2 is the driving pulley of the spindle. I then hang the saw in its bench $t\ t\ t\ t$, Fig. 1, so that a portion of its toothed edge $e\ e$ may stand above the top or bed of the bench. This bench may be of any convenient form. The top of it, however, I fasten at one side only by means of hinges or their equivalent, leaving the other side and the ends free to be moved, by which arrangement and by means of elevating screws placed at $o'\ o'$, Fig. 2, the bed can be thrown into any required angle of elevation and the saw cut square or bevel edged work accordingly. The guide $a\ a\ a$, Fig. 1, is attached to the bed of the bench by screws $d\ d$ passing through extended transverse holes in the guide, into the bed of the bench, thus allowing the guide to be approached to or withdrawn from the saw. The guiding surface $b\ b\ b$ is not solid, however, but consists of a strong metallic strap, supported by the screws $cc\ cc\ cc$, attached to the inner side of the strap and passing through the solid part of the guide, which screws being protruded or retracted give a less or greater curvature to the metallic strap forming the face of the guide. The curvature of the guide may thus be made to correspond with the curvature of the saw.

It is obvious that the washers and rings may be placed upon the spindle in a different order from that adopted in the foregoing construction and yet produce the same effect.

What I claim as my invention, and desire to secure by Letters Patent, is—

The adjustable rings, in combination with the concave and convex washers as described, for the purpose of holding and regulating the saw to any required curvature.

E. B. WELLS.

Witnesses:
W. BEESON,
DANIEL SMITH.